United States Patent [19]

Nockleby

[11] Patent Number: 4,738,208

[45] Date of Patent: Apr. 19, 1988

[54] METERED SEED PLANTING APPARATUS

[76] Inventor: Raymond B. Nockleby, 2577 Highway 93 N., Kalispell, Mont. 59901

[21] Appl. No.: 24,192

[22] Filed: Mar. 10, 1987

[51] Int. Cl.$^4$ .............................................. A01C 7/12
[52] U.S. Cl. ......................................... 111/72; 111/82
[58] Field of Search .................................. 111/70–73, 111/76–79, 81, 82, 85, 86

[56] References Cited

U.S. PATENT DOCUMENTS

| | | | |
|---|---|---|---|
| 4,405 | 3/1846 | Putnam | 111/77 |
| 134,984 | 1/1873 | Eastin | 111/77 |
| 307,508 | 11/1884 | Ullathorne | 111/73 |
| 581,594 | 4/1897 | King | 111/77 |
| 669,600 | 3/1901 | Skinner | 111/71 |
| 687,399 | 11/1901 | Goodwin | 111/76 |
| 859,869 | 7/1907 | Brown | 111/86 |
| 909,991 | 1/1909 | Cole | 111/85 |
| 924,204 | 6/1909 | Thurmond | 111/77 |
| 1,689,866 | 10/1928 | Erickson | 111/82 |
| 2,242,093 | 5/1941 | Stauffacher | 111/78 |
| 2,302,716 | 11/1942 | Riegelsberger et al. | 111/82 |
| 2,615,408 | 10/1952 | Hylten-Cavallius | 111/78 |
| 4,090,457 | 4/1978 | Roberts | 111/82 |

Primary Examiner—James R. Feyrer
Attorney, Agent, or Firm—Henderson & Sturm

[57] ABSTRACT

A metered seed planting apparatus (10) comprising a shoe unit (11); a pivoted seed hopper unit (12); an adjustable seed metering unit (13); a vertically adjustable furrow plow unit (14); a seed bed covering unit (15); and, a wheeled marking unit (60); wherein, the apparatus accomplishes the furrowing, planting, and covering of a seed bed, while simultaneously providing visual markings which identify the seeded portions of the seed bed.

12 Claims, 2 Drawing Sheets

METERED SEED PLANTING APPARATUS

TECHNICAL FIELD

The present invention relates generally to the field of seed planting devices.

BACKGROUND OF THE INVENTION

The prior art is replete with diverse constructions for seed planting apparatus that are designed to prepare, plant, and cover seed beds containing one or more varieties of seed.

Examples of some of these prior art constructions may be seen by reference to the following U.S. Pat. Nos.: 134,984; 4,405; 669,600; 581,594; 924,204; 2,302,716; 2,242,093; and, 4,090,457.

Briefly stated, the prior art constructions are usually characterized by the following common structural features: a metering element, a seed hopper, a furrow plow element; and a trailing earth tamping element.

As will no doubt be noted by reference to the aforementioned prior art patented structures, the basic structural components are subject to myriad arrangements whose basic function produces the same general results.

Needless to say, all of the prior art constructions are at least adequate from the standpoint of accomplishing their design objectives; and while some prior art constructions are obviously superior to others, this particular area of technology has not been exhausted relative to improved metered seed planting apparatus which incorporate the aforementioned basic structural components.

SUMMARY OF THE INVENTION

The metered seed planting apparatus that forms the basis of the present invention comprises in general: a shoe unit; a seed hopper unit; an adjustable seed metering unit; an adjustable furrow plow unit; a seed bed covering unit; and, a wheeled marking unit.

The particular construction of the metered seed planting apparatus of this invention was specifically designed for use in small plots of land such as would be utilized by back yard or home gardeners. In addition, the seed planting apparatus is intended for use and will produce the best results in conjunction with a well prepared seed bed; wherein, the soil has been worked up such that the earth is fairly smooth, loose and free of lumps.

Still emphasizing the particular environment for which this seed planting apparatus was developed; it should further be noted that the apparatus itself is relatively small, compact, and lightweight for ease of handling and storage purposes. Furthermore, given the fact that most home gardeners purchase pre-packaged seed packets containing very small volumes or numbers of seed, significant reduction in the size and wieght of the apparatus are not only possible, but also very desirable from the end users standpoint.

As will be explained in greater detail further on in the body of this specification, the seed hopper unit is operatively connected to the shoe unit and the adjustable seed metering unit. The wheeled marking unit is operatively associated with the adjustable seed metering unit; wherein, the lateral displacement of the wheeled marking effects the adjustment of the seed metering unit.

In addition, the adjustable furrow plow unit and the seed bed covering unit are operatively associated with the bottom portion of the shoe unit; whereby, the furrow plow unit is disposed in front of the outlet of the seed metering unit, and the seed bed covering unit is disposed behind the outlet of the seed metering unit.

As the apparatus traverses the prepared seed bed, the furrow plow unit penetrates the soil to a preselected depth, the seed metering unit then deposits individual seeds at pre-determined intervals, and the seed covering unit collapses the raised furrow walls to cover the seeds. Simultaneously with the aforementioned operations, the marking unit of the apparatus creates spaced indentations in the soil to mark the passage of the apparatus across the seed bed so that the user may visibly determine the seeded areas of the garden plot.

BRIEF DESCRIPTION OF THE DRAWINGS

These and other objects, advantages, and novel features of the invention will become apparent from the detailed description of the best mode for carrying out the preferred embodiment of the invention which follows, particularly when considered in conjunction with the accompanying drawings, wherein.

BEST MODE FOR CARRYING OUT THE INVENTION

Figure 1:
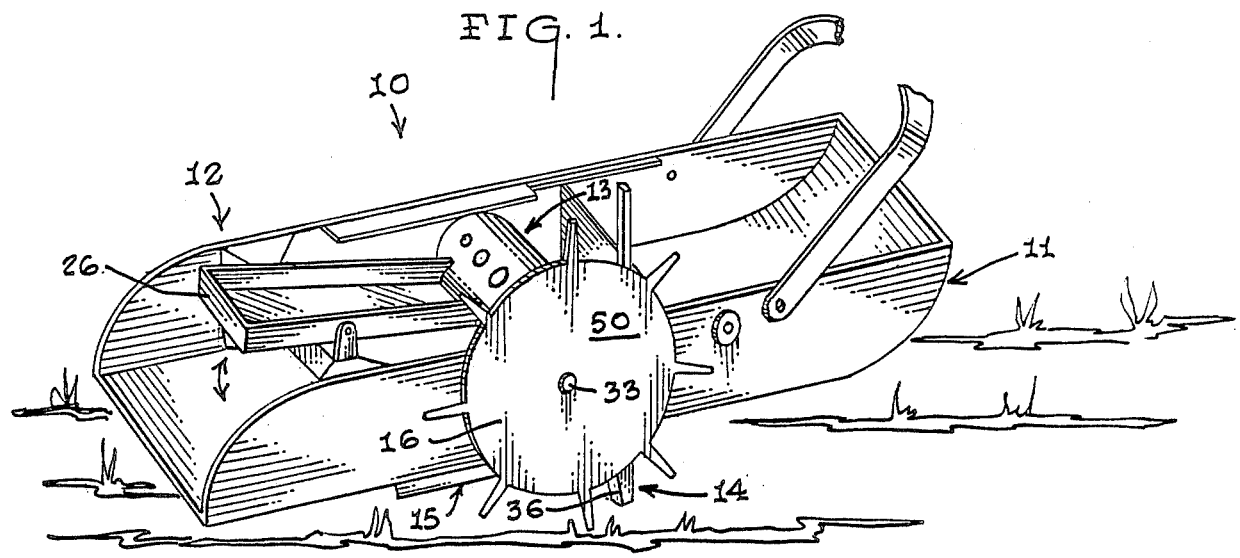
FIG. 1 is a perspective view of the metered seed planting apparatus of the invention.
Figure 2:
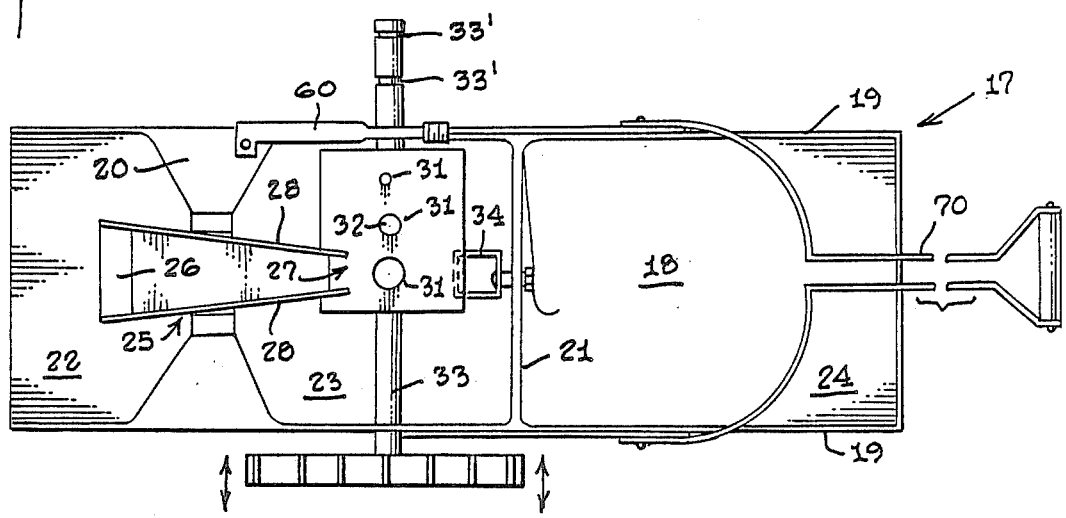
FIG. 2 is a top plan view of the apparatus.
Figure 3:
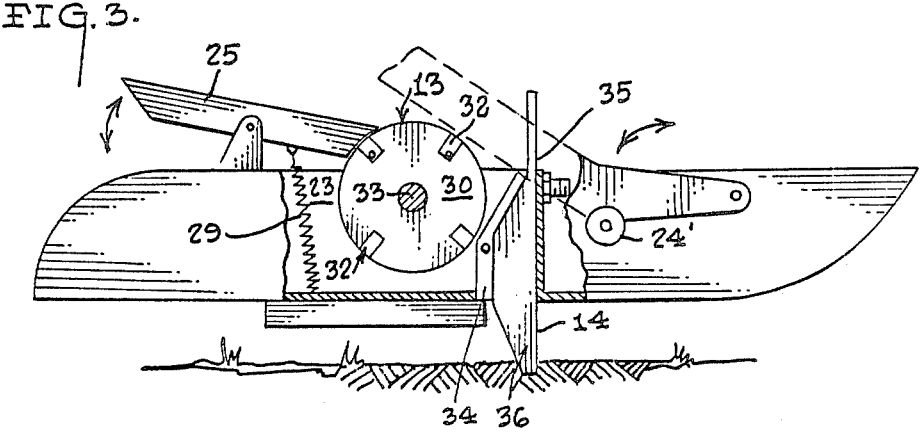
FIG. 3 is a cross-sectional view of the apparatus taken thru line 3—3 of FIG. 2.

As can be seen by reference to the drawings and in particular to FIGS. 1 thru 3, the metered seed planting apparatus that forms the basis of the present invention is designated generally by the reference numeral (10). The apparatus (10) comprises in general a shoe unit (11); a seed hopper unit (12); an adjustable seed metering unit (13); a furrow plow unit (14); a seed bed covering unit (15); and, a wheeled marking unit (16).

As shown in FIGS. 1 and 2, the shoe unit (11) comprises an elongated generally rectangular shoe body member (17) having a contoured floor element (18) and a pair of side walls (19); wherein, the side walls (19) are connected by a rear partition element (20) and a front partition element (21) which divide the shoe body member (17) into a rear compartment (22), a middle compartment (23), and a front compartment (24).

The seed hopper unit (12) comprises a limited capacity elongated narrow tapered seed receptacle (25) having a relatively large angled rear receptacle wall (26) and a relatively small contoured front seed outlet (27) formed by the converging receptacle side walls (28). In addition, the seed hopper unit (12) is pivofally mounted on the shoe unit (11) intermediate the rear (22) and middle (23) compartments; wherein, the forward end of the seed receptacle (25) is provided with a spring element (29) which normally biases the seed outlet (27) into engagement with the adjustable seed metering unit (13).

As can best be seen by reference to FIGS. 2 and 3, the adjustable seed metering unit (13) comprises an enlarged seed feeding cylinder (30) provided with a plurality of rows (31) of seed recesses (32); wherein, the spacing and dimensions of the recesses (32) in each individual row (31) are uniform; yet, the spacing and dimensions of the recesses (32) in adjacent rows (31)

varies along the axial length of the seed feeding cylinder (30).

The adjustable seed metering unit (13) is rotatably supported in the middle compartment (23) of the shoe unit (11) by means of an axle member (33) that extends through the side walls (19) of the shoe body member (17). In addition, the axle member (33) and the seed feeding cylinder (30) are laterally displaceable as an integral unit to bring different rows (31) of the seed feeding cylinder (30) into alignment with the seed outlet (27) as will be described in greater detail further on in the specification.

As can be seen in FIGS. 2 and 3, the middle compartment (23) of the shoe unit (11) is provided with a seed chute outlet (34) positioned below the seed feeding cylinder (30) at a location proximate the front partition element (21). The adjustable furrow plow unit (14) is operatively associated with the seed chute outlet (34) and the front partition element (21); wherein, the furrow plow unit (14) extends through the seed chute outlet (34) and is vertically displaceable with respect thereto, to vary the depth of the plow unit (14) beneath the shoe unit (11).

The furrow plow unit (14) comprises in general an elongated furrow plow member (35) having a plow blade (36) disposed on its lower end, and a plurality of detent recesses (37) spaced at uniform intervals; wherein, each of the recesses (37) are provided with indicia (38) representative of a given seed depth.

Figure 6:
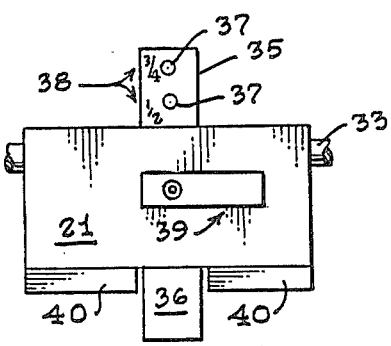
FIG. 6 is a detail view of the adjustable furrow plow unit.

As can best be seen by reference to FIGS. 2, 3, and 6, the front partition element (21) is provided with a spring loaded detent member (39); wherein, the detent member (39) is operatively associated with the detent recesses (37) in the plow member (35) for varying the position of the plow blade (36) relative to the bottom (11') of the shoe unit (11).

Figure 5:
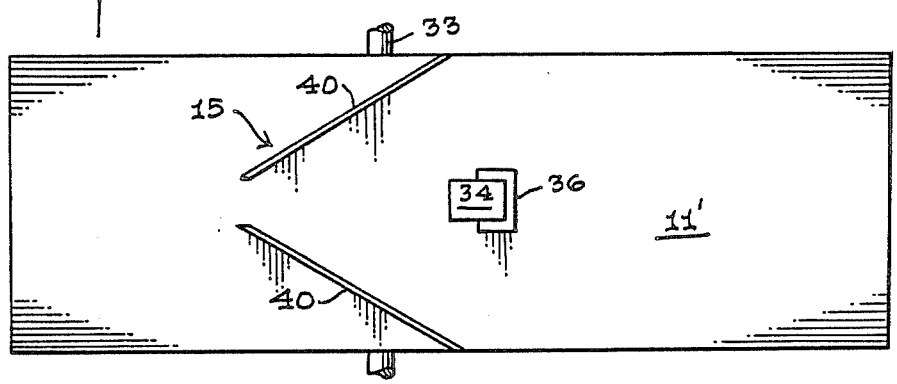
FIG. 5 is a bottom plan view of the apparatus.

The seed bed covering unit (15) as shown in FIGS. 3 and 5, comprises a pair of inwardly angled downwardly projecting scraper elements (40) attached to the bottom (11') of the shoe unit (11); wherein, the scraper elements (40) are disposed in a converging fashion behind the seed chute outlet (34); whereby the scraper elements (40) in conjunction with the trailing edge of the shoe unit (11) will collapse the earthen furrow walls upon the deposited seeds and then level and firm the seed bed surface.

The wheeled marking unit (16) comprises a marking member (42) attached to the seed metering axle member (33); wherein, the marking member (42) is provided with a plurality of outwardly projecting marking elements (43) in the form of ground penetrating spikes (44), which create spaced indentations in the soil, to mark the passage of the apparatus across the seed bed. In addition, the wheeled marking unit (16) further comprises a wheel member (50) disposed on the outboard ends of the seed metering axle member (33).

As can best be appreciated by reference to FIG. 2, the seed metering axle member (33) is provided with a plurality of spaced reduced diameter recesses (33'), which cooperate with a releasable axle retention means (60) connected to the shoe body member (17); whereby, the axle member, (33) may be retained at a desired location relative to the shoe body member (17) by the selective engagement of the retention member (60) with one of the axle recesses (33') to align a given row (31) of seed recesses (32) with the seed chute outlet (34).

Figure 4:
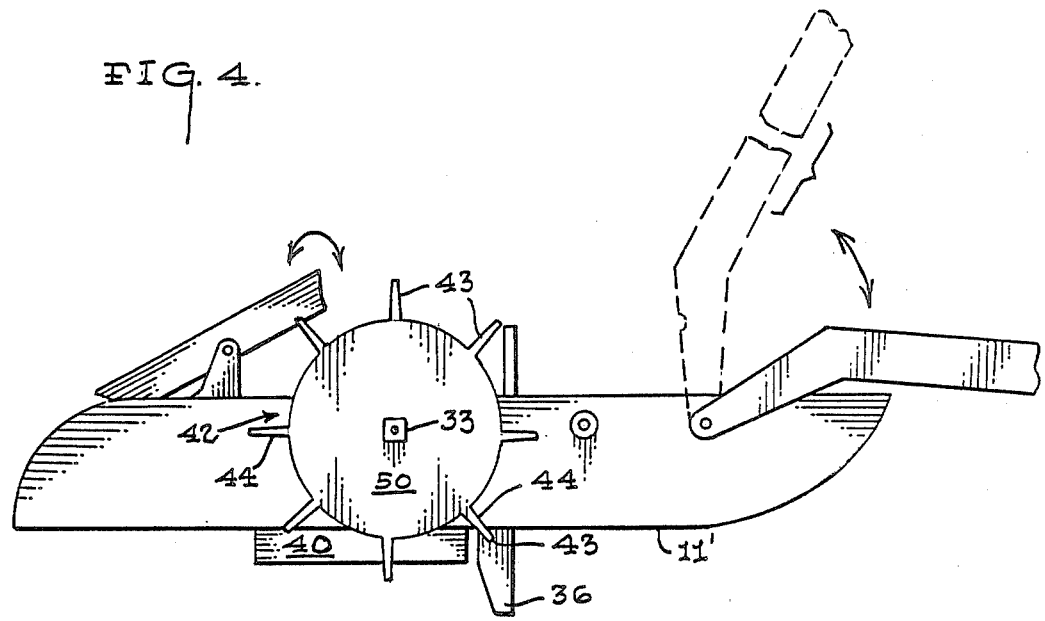
FIG. 4 is a side plan view of the apparatus.

As shown in FIGS. 3 and 4, the apparatus (10) is further provided with a pivoted handle member (70); wherein, the inboard end of the handle member (70) is pivotally secured to the side walls (19) of the shoe body member (17) in the forward portion of the front compartment (24). In addition, the rearward portion of the front compartment (24) is provided with stop means (24') which will limit the rearward pivotal movement of the handle member (70) relative to the shoe body member (17).

The operation of the metered seed planting apparatus (10) will now be described in detail. The user of the apparatus will adjust the furrow plow unit (14) to the desired seed depth by engaging the releasable detent member (39) in the appropriate detent recess (37) in the furrow plow member (35) to dispose the plow blade (36) at the proper depth. The user will then laterally translate the axle member (33) to align the complementary sized row (31) of recesses (32), according to the seed dimensions, with respect to the seed chute outlet (34). With the handle member (70) pivoted generally to the position depicted in FIG. 4, the user will deposit the contents of a seed packet into the seed receptacle (25). At this juncture the handle member (70) will be pivoted rearwardly to engage the handle stop means (24'); wherein, the trailing portion of the shoe unit (11) will pivot about the axle member (33) to bring the trailing edge of the shoe body member (17) into engagement with the ground.

As the apparatus (10) is pushed across the prepared seed bed, the furrow plow blade (36) penetrates the soil to a given depth. Simultaneously with this action, the seed feeding cylinder is rotatably and slideably engaging the contoured seed outlet (27) of the seed receptacle (25); whereupon, seeds are deposited into the aligned seed recesses (32) and deposited by gravity into the seed chute outlet (34). After the seeds are deposited through the rearward portion of the furrow plow member (35), which defines a portion of the seed outlet chute (34), the scraper elements collapse the furrow walls inwardly to cover the seeds. Then the trailing edge of the shoe body member (17) levels and firms the planted seed row. In addition, as the apparatus (10) is traversing the seed bed, the marking unit is creating visual reference marks, whereby, the user can determine which portions of the seed bed have been planted.

Once the seeding operation is completed the handle member (70) will be pivoted to the position of FIG. 4, and unused seeds remaining in the seed receptacle (25) may be returned to the seed packet by pivoting the seed receptacle in the direction of the rear compartment.

Having thereby described the subject matter of this invention it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A metered seed planting apparatus for use by movement in small garden plots having a well prepared seed bed; wherein, the apparatus comprises:
   a shoe unit having a seed outlet chute;
   a seed hopper unit pivotally secured to said shoe unit;
   means mounting a seed metering unit for adjustment, said seed metering unit comprising a seed feeding cylinder provided with a plurality of rows of seed recesses; wherein, the seed feeding cylinder is rotatably supported in the shoe unit by an axle member, means mounting said axle member to be laterally displaceable with respect to said shoe unit;

a spring element attached on one end to said seed hopper unit and attached on the other end to the shoe unit for biasing said hopper unit into engagement with said seed feeding cylinder;

a furrow plow unit forming a portion of said seed outlet chute means mounting said furrow plow unit to be vertically displaceable with respect to said shoe unit;

a seed bed covering unit associated with the bottom of the shoe unit; and, a wheeled marking and power-taking unit operatively connected to said axle member.

2. The apparatus as in claim 1; wherein, said shoe unit comprises:

an elongated generally rectangular shoe body member having a contoured floor element and a pair of side walls; wherein, said side walls are connected by front and rear partition elements which form front, middle, and rear compartments in the shoe body member.

3. The apparatus as in claim 2; wherein, the seed hopper unit comprises:

a tapered seed receptacle having an angled rear receptacle wall and converging receptacle side walls which form a contoured seed outlet; wherein, the contoured seed outlet corresponds to the shape of and engages the periphery of said seed feeding cylinder.

4. The apparatus as in claim 3; wherein, the seed receptacle is pivotally mounted on said rear partition element.

5. The apparatus as in claim 4; wherein, the furrow plow unit comprises:

an elongated furrow plow member having a plow blade disposed on its lower end and a plurality of detent recesses formed on its upper end; wherein, the furrow plow member is adjustably associated with the front partition element.

6. The apparatus as in claim 5; wherein, the adjustable association between the furrow plow member and the front partition element comprises a spring loaded detent member mounted on, and extending through said front partition element; wherein, said detent member corresponds in size to and is mateingly received within any selected one of said plurality of detent recesses on the furrow plow member.

7. The apparatus as in claim 6; wherein, the seed bed covering unit comprises:

a pair of downwardly depending and inwardly converging scraper elements attached to the bottom of said shoe unit rearwardly of said seed chute outlet.

8. The apparatus as in claim 1; wherein, said laterally adjustable axle member is provided with a plurality of reduced diameter recesses.

9. The apparatus as in claim 8; wherein, the shoe body member is provided with a releasable axle retention means which cooperates with the reduced diameter recesses in said axle member, to position a selected row of seed recesses in alignment with the seed receptacle outlet.

10. The apparatus as in claim 9; wherein, the wheeled marking unit comprises:

a marking member attached to rotate with said axle member; and, a wheel member disposed on the outboard end of said axle member.

11. The apparatus as in claim 10; wherein, the marking member is further provided with a plurality of marking elements which create spaced indentations in the soil.

12. The apparatus as in claim 11; wherein, the marking elements comprise ground penetrating spikes.

* * * * *